United States Patent
Yokoyama et al.

(10) Patent No.: US 7,166,245 B2
(45) Date of Patent: Jan. 23, 2007

(54) INJECTION CONTROL METHOD OF DIE-CASTING MACHINE AND INJECTION CONTROL UNIT OF DIE-CASTING MACHINE

(75) Inventors: Hiroshi Yokoyama, Ebina (JP); Yuji Kaneko, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 144 days.

(21) Appl. No.: 09/849,344

(22) Filed: May 7, 2001

(65) Prior Publication Data

US 2001/0044671 A1  Nov. 22, 2001

(30) Foreign Application Priority Data

May 8, 2000 (JP) ............................. 2000-134821

(51) Int. Cl.
*B29C 45/76* (2006.01)
*B29C 45/77* (2006.01)

(52) U.S. Cl. ..................................... 264/40.1; 264/40.7

(58) Field of Classification Search .............. 264/40.1, 264/40.7; 425/150

See application file for complete search history.

(56) References Cited

U.S. PATENT DOCUMENTS

| | | | | |
|---|---|---|---|---|
| 5,258,918 A | * | 11/1993 | Giancola | 700/203 |
| 5,316,707 A | * | 5/1994 | Stanciu et al. | 264/40.1 |
| 5,518,390 A | * | 5/1996 | Nakamura et al. | 425/145 |
| 5,518,671 A | * | 5/1996 | Takizawa et al. | 264/40.1 |
| 5,792,483 A | * | 8/1998 | Siegrist et al. | 425/135 |
| 5,870,305 A | * | 2/1999 | Yokoyama | 700/146 |
| 5,997,778 A | * | 12/1999 | Bulgrin | 264/40.1 |

FOREIGN PATENT DOCUMENTS

| | | |
|---|---|---|
| JP | 05-245899 | 9/1993 |
| JP | 06-039516 | 2/1994 |
| JP | 06-079432 | 3/1994 |
| JP | 09-253824 | 9/1997 |

OTHER PUBLICATIONS

Rosato, Dominick, Donald Rosato, and Marlene Rosato, ed.'s. Injection Molding Handbook, 3rd edition. 2000. Kluwer Academic Publishers. pp. 623-626.*

* cited by examiner

*Primary Examiner*—Christina Johnson
*Assistant Examiner*—Monica A Huson
(74) *Attorney, Agent, or Firm*—Pillsbury Winthrop Shaw Pittman LLP

(57) ABSTRACT

Target velocity data D14 specifying injection operation required for a injection cylinder unit is set in advance, the injection operation is performed actually, command data D17 given to the injection cylinder unit during the injection operation and detected velocity data D15 indicating the operation performed by the injection cylinder unit are recorded, correction value data D18 is calculated from a difference between the detected velocity data D15 and the target velocity data D14 to correct the command data D17 of the previous injection operation by using the correction value, auxiliary amplifier command data D19 is generated as the command data for the next injection operation, and the injection cylinder unit is operated by giving the generated auxiliary amplifier command data at the time of the next injection operation.

2 Claims, 12 Drawing Sheets

FIG.7

TARGET WAVE FORM DATA SETTING TABLE

D12

| POINT | s0 | s1 | s2 | s3 | s4 | s5 | s6 |
|---|---|---|---|---|---|---|---|
| POSITION | 0 | $L1=$ $w1$ | $L2=$ $w1+w2$ | $L3=$ $w1+\cdots$ $+w3$ | $L4=$ $w1+\cdots$ $+w4$ | $L5=$ $w1+\cdots$ $+w5$ | $L6=$ $w1+\cdots$ $+w6$ |
| VELOCITY | 0 | V1 | V1 | V2 | V2 | V3 | 0 |

FIG. 8

TIME SERIES DATA TABLE OF TARGET WAVE FORM

| TIME(sec) | POINT | POSITION | DISTANCE | VELOCITY |
|---|---|---|---|---|
| 0.000 | s0 | 0 | 0 | 0 |
| 0.001 | | | | |
| ... | | | | |
| 1.000 | s1 | L1 | w1=L1-0 | v01=w1/dT |
| ... | | | | |

INJECTION CONTROL METHOD OF DIE-CASTING MACHINE AND INJECTION CONTROL UNIT OF DIE-CASTING MACHINE

CROSS REFERENCE TO RELATED APPLICATIONS

This application claims priority to Japanese application No. 2000-134821, filed May 8, 2000, the contents of which is incorporated herein in its entirety by reference.

BACKGROUND OF THE INVENTION

1. Field of the Invention

The present invention relates to an injection control method and an injection control unit for a die-casting machine, more particularly, which can be used for injection control of a die-casting machine in which an injection velocity is controlled to turn out high-quality die cast products.

2. Description of Related Art

It has so far been known that the quality of a die cast product is greatly influenced by an injection velocity and an injection pressure when melt is charged into a mold. Therefore, various considerations are given to the control of these velocity and pressure.

For example, in injecting melt into the mold by using an injection cylinder unit, a procedure is used in which an injection plunger is first advanced at a low velocity so as to prevent melt in a passage from bubbling, and when the front end of melt reaches the interior of the mold, the advance velocity is switched to a high velocity to charge the melt into the mold by pushing it at a stroke.

These injection operations must be performed exactly during a short period of time before the melt solidifies. Therefore, if control of various operational conditions is carried out manually, a satisfactory result cannot be obtained, and also the work efficiency is decreased. These setting operations are performed rapidly by a skilled worker, but it is desired that they be performed properly by everybody.

In view of the above-described situation, there has been developed a technology for automatically controlling a series of injection operations ranging from low-velocity injection to high-velocity injection for a die-casting machine.

For example, in the control method for a die-casting machine proposed by the applicant of the present invention (Unexamined Japanese Patent Publication No. 9-253824), the target values of a low injection velocity and a high injection velocity are set in advance, and a value (mean value thereof) detected in the actual injection operation is compared with the target values. By correcting control values so as to eliminate the difference, control can be accomplished so that the actual injection state automatically approaches the target state.

In the above-described control method for a die-casting machine, although a high-velocity injection operation and a low-velocity injection operation are controlled, it is difficult to carry out control over the whole section of injection operation.

Also, since there is gate resistance depending on mold characteristics, it is not easy to issue a velocity command to be executed by open loop control of injection velocity from the beginning.

Besides, since the die-casting machine used mainly at present is based on position feedback, it is required to ensure affinity with the position feedback system.

SUMMARY OF THE INVENTION

An object of the present invention is to provide an injection control method for a die-casting machine, in which initial command data including mold characteristics is generated based on feedback of injection position, and proper velocity control and the automatic adjustment can be carried out based on the initial command data.

To achieve the above object, the present invention provides an injection control method for a die-casting machine, in which melt is injected into a casting mold by using an injection cylinder unit, comprising the steps of: setting target velocity data specifying injection operation required for the injection cylinder unit in advance; performing the injection operation actually, and recording command data given to the injection cylinder unit during the injection operation and detected velocity data indicating the operation performed by the injection cylinder unit; calculating a correction value from a difference between the detected velocity data and the target velocity data to correct the command data for the previous injection operation by using the correction value, and generating the command data for the next injection operation; and operating the injection cylinder unit by giving the generated command data at the time of the next injection operation.

In the configuration described above, the correction value is calculated based on the previous injection operation, and the command data for the previous injection operation is corrected by using this correction value, so that an exact operation can be ensured in the next injection operation. At this time, the detected velocity data can be calculated from position feedback. In the present invention, therefore, proper velocity control can be realized even in the injection control of a die-casting machine based on position feedback.

In the present invention, it is preferable that the correction value be obtained by operating the injection cylinder unit a predetermined number of times by the ordinary injection position feedback control, and thereafter, the control be shifted to open loop control of injection velocity by using command data generated from the correction value and the previous command data.

The predetermined number of times may be one time or a plurality of times.

In this case, by first performing the operation by the ordinary injection position feedback control, special preparations necessary for the calculation of correction value of the present invention or the like can be avoided. Also, by using the previous data obtained during the operation by injection position feedback control, the control is shifted to the open loop control of injection velocity for the next shot, so that the operation control based on the calculation of correction value in accordance with the present invention can be carried out.

In the present invention, it is preferable that a value of servo delay in the injection cylinder unit be set in advance, and in calculating the correction value, a difference with the target velocity data be calculated in a state in which the phase of the detected velocity data is advanced by the servo delay.

In this case, the corresponding operation portions can be allowed to correspond to each other when a difference between the detected velocity data and the target velocity data for calculating the correction value is calculated.

Specifically, a slight servo delay is inevitable in a servo system for the injection cylinder unit. If the servo delay becomes remarkable, the detected velocity data and the target velocity data, which are compared with each other, do not correspond correctly to each other, so that a proper correction value cannot be obtained. Contrarily, if the calculation is performed considering the servo delay, a more exact correction value can be obtained.

Adjustment of the servo delay is preferably made for each of low-velocity section, high-velocity section, and deceleration section of injection operation.

In this case, a shift between the detected velocity data and the target velocity data due to servo delay can be compensated more reliably, so that a more exact correction value can be obtained.

In the present invention, it is preferable that in setting the target velocity data, a pattern in terms of position and velocity for specifying injection operation be set in advance by a user, the pattern be converted into time-series position command data in terms of position and time so as to be used for injection position feedback control, and the pattern be converted into target velocity data in terms of velocity and time.

In this case, the user can perform programming with the injection waveform pattern in terms of position and velocity in mind. Such an injection waveform pattern in terms of position and velocity has conventionally been general for a die-casting machine and easily understood by the operator. Therefore, by deriving various types of data necessary for the present invention from the injection waveform pattern in terms of position and velocity, the ease of user setting can be increased, and the handling performance can be improved further.

BRIEF DESCRIPTION OF THE DRAWINGS

FIG. 7 is a schematic chart showing user-set data in the embodiment shown in FIG. 1;

FIG. 8 is a schematic chart showing processing of user-set data in the embodiment shown in FIG. 1;

DETAILED DESCRIPTION OF PREFERRED EMBODIMENT(S)

One embodiment of the present invention will now be described with reference to the accompanying drawings.

Figure 1:
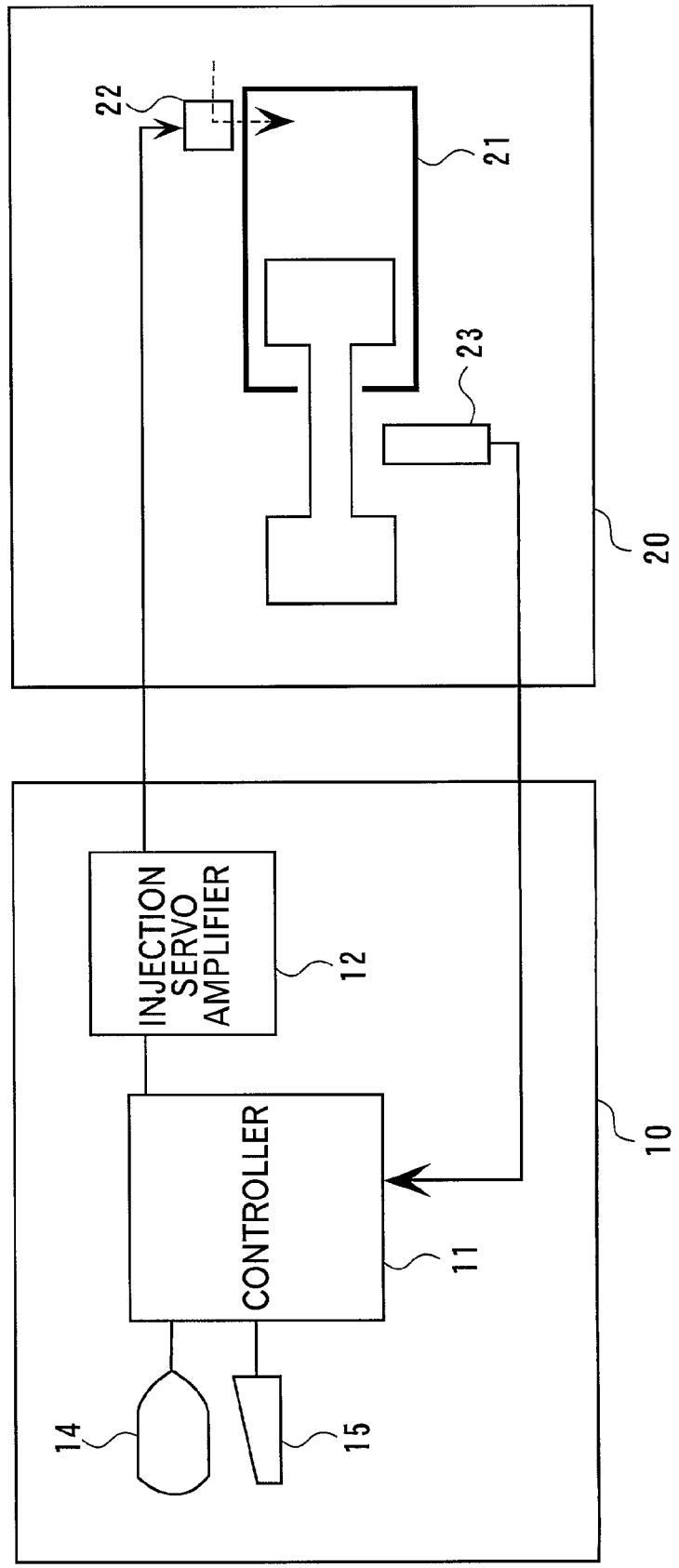
FIG. 1 is a block diagram showing one embodiment of the present invention.

In FIG. 1, a control unit 10 for a die-casting machine controls the injection operation of a die-casting machine 20. The control unit 10 has a controller 11 using a computer system such as a numerical control system (NC system).

The controller 11 is connected with a display 14 for generating displays and a keyboard 15 for operation. As necessary, an input device such as a mouse is added. The controller 11 is connected with an injection servo amplifier 12, and the output of the injection servo amplifier 12 is connected to the die-casting machine 20.

The die-casting machine 20 has an injection cylinder unit 21 provided with an injection servo valve 22 for controlling hydraulic oil introduced into the machine. The output of the injection servo amplifier 12 is connected to the injection servo valve 22. By the opening/closing of the injection servo valve 22 performed based on a command sent from the controller 11, exact operation control of the injection cylinder unit 21 is carried out.

The injection cylinder unit 21 is provided with a position sensor 23 for detecting a displacement of a movable portion. The output of the position sensor 23 is connected to the controller 11. When opening/closing the injection servo valve 22 via the injection servo amplifier 12, the controller 11 monitors travel position data sent from the position sensor 23, by which the operation control of a position feedback type is carried out so that the injection cylinder unit 21 performs a desired injection operation.

Figure 2:
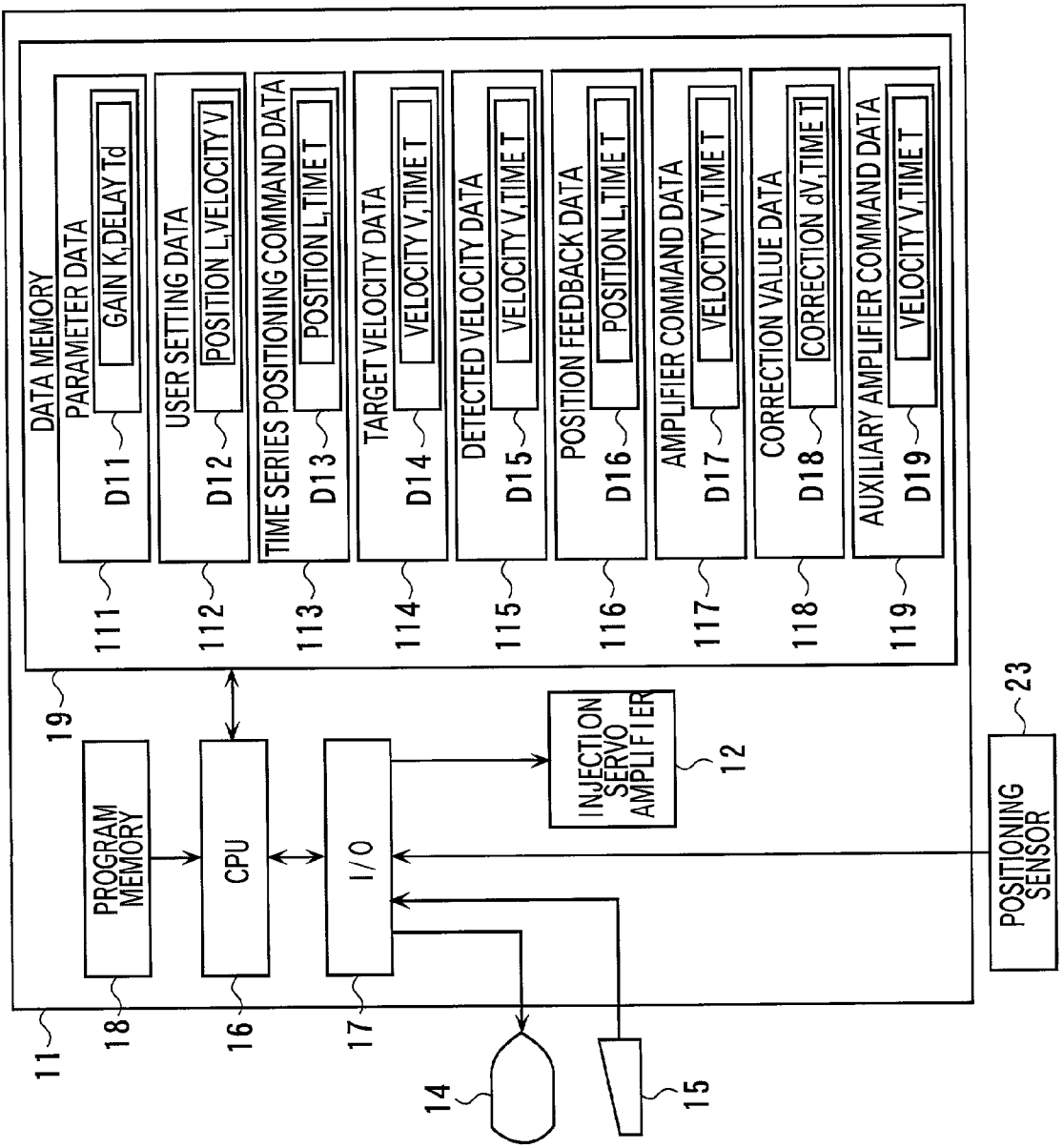
FIG. 2 is a block diagram showing an essential part of the embodiment shown in FIG. 1.

In FIG. 2, the controller 11, which is basically a computer system, includes a CPU 16 such as a microcomputer, an input/output interface (I/O) 17, a program memory 18 using a semiconductor memory etc., and a data memory 19.

The input/output interface 17 transfers data between the CPU 16 and the injection servo amplifier 12, position sensor 23, display 14, and keyboard 15.

The CPU 16 performs operations in accordance with an operation program recorded in the program memory 18, and also reserves storage areas (111 to 119) for data necessary for the present invention in the data memory 19.

The storage areas reserved in the data memory 19 are a parameter data area 111, a user-set data area 112, a time-series position command data area 113, a target velocity data area 114, a detected velocity data area 115, a position feedback data area 116, an amplifier command data area 117, a correction value data area 118, and an auxiliary amplifier command data area 119.

The parameter data area 111 stores parameter data D11.

The parameter data D11 includes constants etc. for each of the die-casting machines 20. For example, a servo gain K for feedback control of the injection cylinder unit 21, a servo delay Td, a switching position between high-velocity operation and low-velocity operation, standard velocity of low-velocity operation and high-velocity operation, and the like are included.

Of these data, most of them are determined according to the die-casting machine 20, so that they are set when the die-casting machine 20 or the control unit 10 is installed.

These data are appropriately referred to at the time of injection control using the controller 11. For example, a gain K for control system, specifically, a gain K1 in the injection position feedback control shown in FIG. 3, a gain K2 in the pre-injection processing for open loop control of injection velocity shown in FIG. 4, a delay Td in the pre-injection processing for open loop control of injection velocity shown in FIG. 4, and the like are given by the parameter data D11.

The user-set data area 112 stores user-set data D12.

Figure 6:
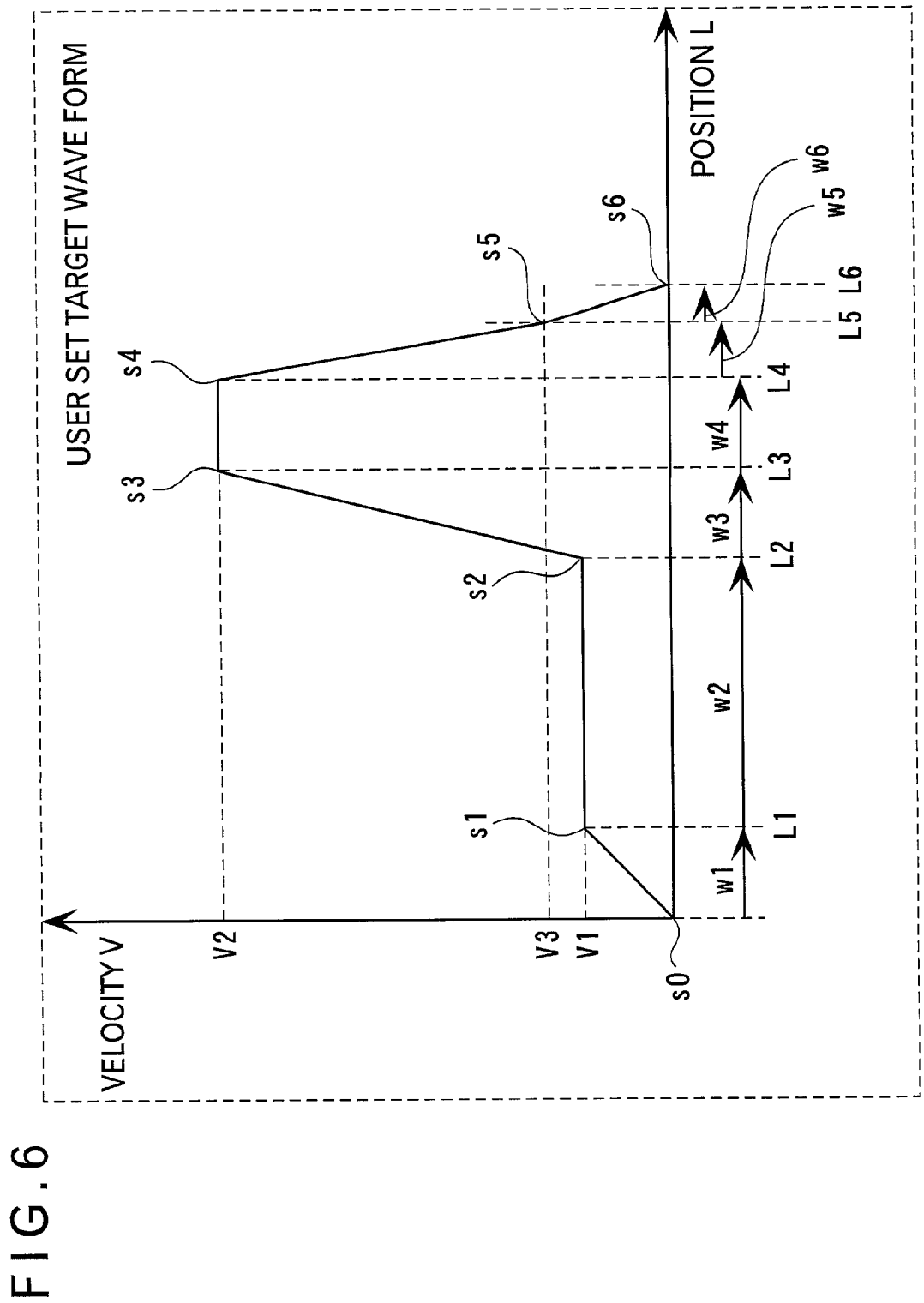
FIG. 6 is a graph showing a user-set target waveform in the embodiment shown in FIG. 1.

The user-set data D12 specifies an operation (different according to molded product) performed by the die-casting machine 20, and specifically is given as a user-set target waveform pattern as shown in FIG. 6.

In FIG. 6, this pattern has seven points of s0 to s6. The section of s0 to s2 is a low-velocity injection section, the section of s2 to s4 is a high-velocity injection section, and the section of s4 to s6 is a deceleration section. Each of the points s1 to s6 is specified by position L and velocity V. Specifically, FIG. 6 is of a parameter type according to the existing setting such as to indicate, for example, a position where low-velocity injection is switched to high-velocity injection (example of point s2).

The velocity V and position L (= L1 to L6) of each of the points s0 to s6 can be set by inputting numerical values from the keyboard 15. For example, a table shown in FIG. 7 is displayed on the display 14, and a numerical value can be entered in each frame. At this time, the position may be entered as position information such as L1 and so on or may be cumulative distance information such as w1 and so on.

On the other hand, the pattern shown in FIG. 6 is displayed on the display 14, and each point may be set by using the mouse. After the points are set approximately by using an image, they may be set in detail by the numerical representation in FIG. 7.

Such user-set data D12 is referred to as an operation standard at the time of injection control using the controller 11. For example, in the injection position feedback control shown in FIG. 3, it is handled as basic data for position command.

The time-series position command data area 113 stores time-series position command data D13.

The time-series position command data D13 is derived from the user-set target waveform pattern (see FIGS. 6 and 7) used for setting the user-set data D12.

Although the user-set target waveform pattern is a function of position and velocity, this pattern can be expanded taking time as the parameter as in a time-series data table shown in FIG. 8.

Figure 9:
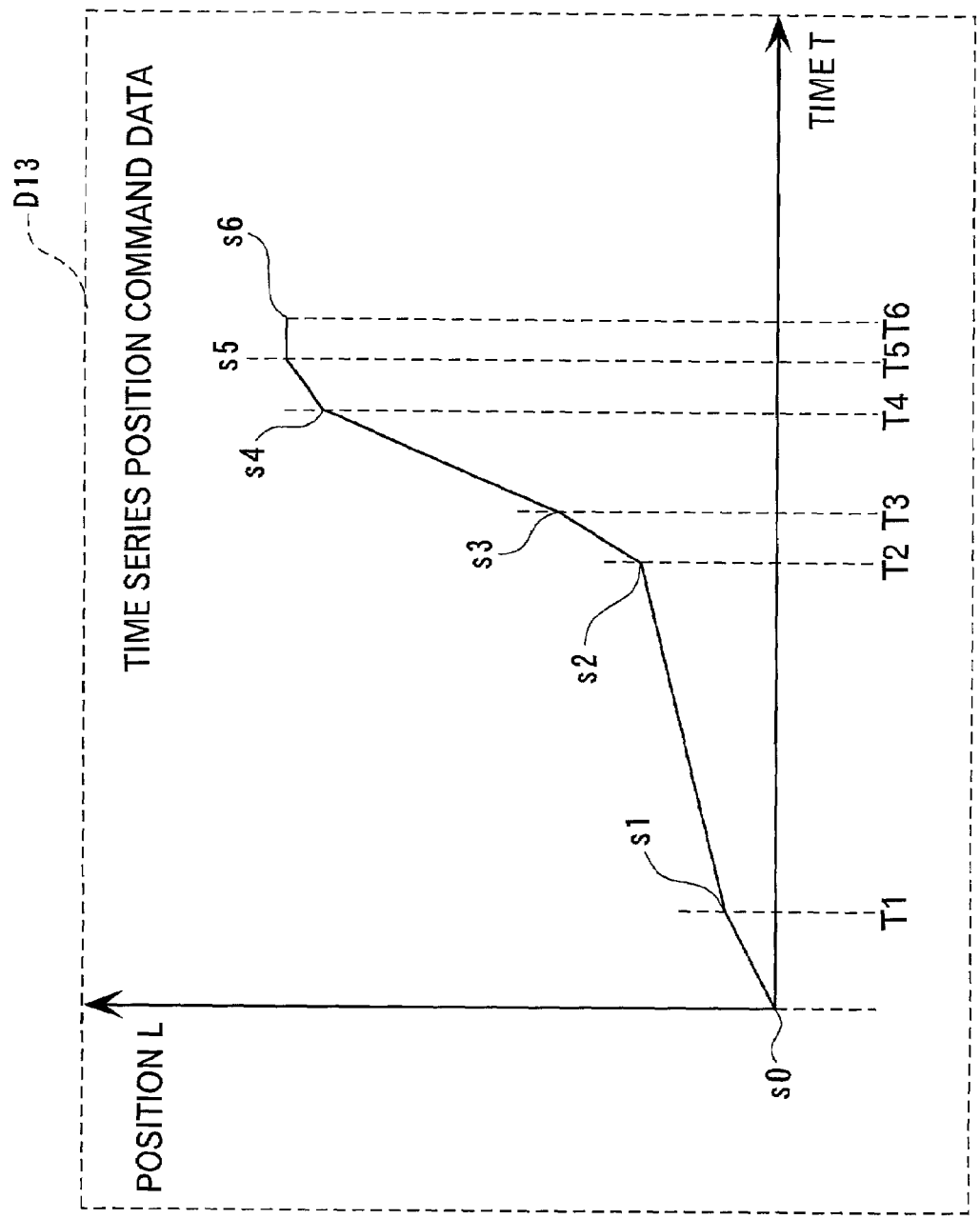
FIG. 9 is a graph showing time-series position command data in the embodiment shown in FIG. 1.

In FIG. 8, assuming that the time for point s1 is T=1.000 sec, the position at this time is L=L1. Similarly, the relationship between time T and position L can be expressed as data for each point of the user-set target waveform pattern including all points s0 to s6. Thereby, the time-series position command data D13 expressed by time T and position L is generated (see FIG. 9).

Figure 3:
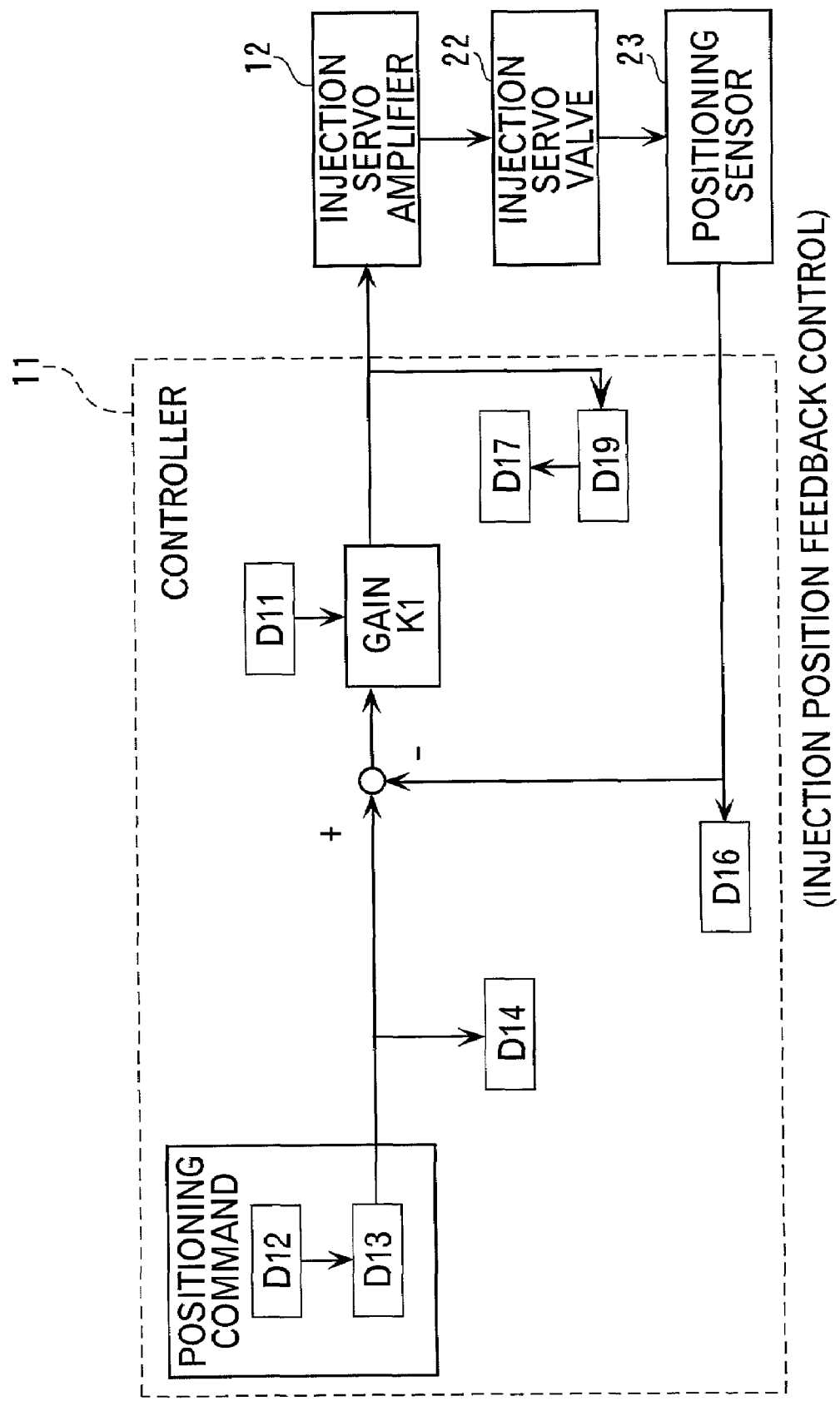
FIG. 3 is a block diagram showing a control model in an injection position feedback control state in the embodiment shown in FIG. 1.

The time-series position command data D13 obtained as described above is handled as basic data for position command in the injection position feedback control shown in FIG. 3, and is used when the injection cylinder unit 21 is controlled.

The target velocity data area 114 stores target velocity data D14.

Figure 10:
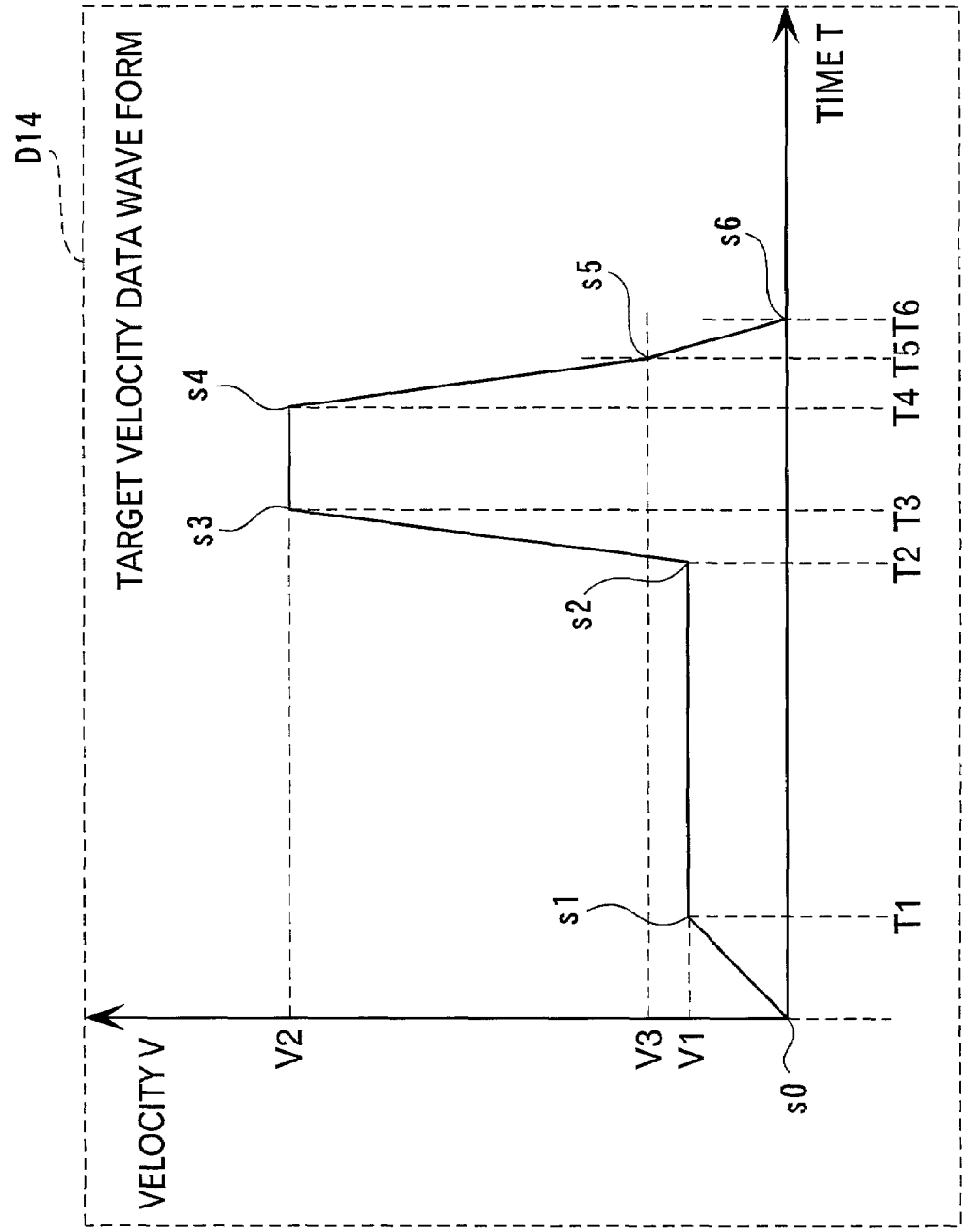
FIG. 10 is a graph showing target velocity data in the embodiment shown in FIG. 1.

Like the time-series position command data D13, the target velocity data D14 is derived by expanding the user-set target waveform pattern (see FIGS. 6 and 7, function of position and velocity) used for setting the user-set data D12 into the time-series data table shown in FIG. 8, and is generated as a function of time T and velocity V (see FIG. 10).

Figure 4:
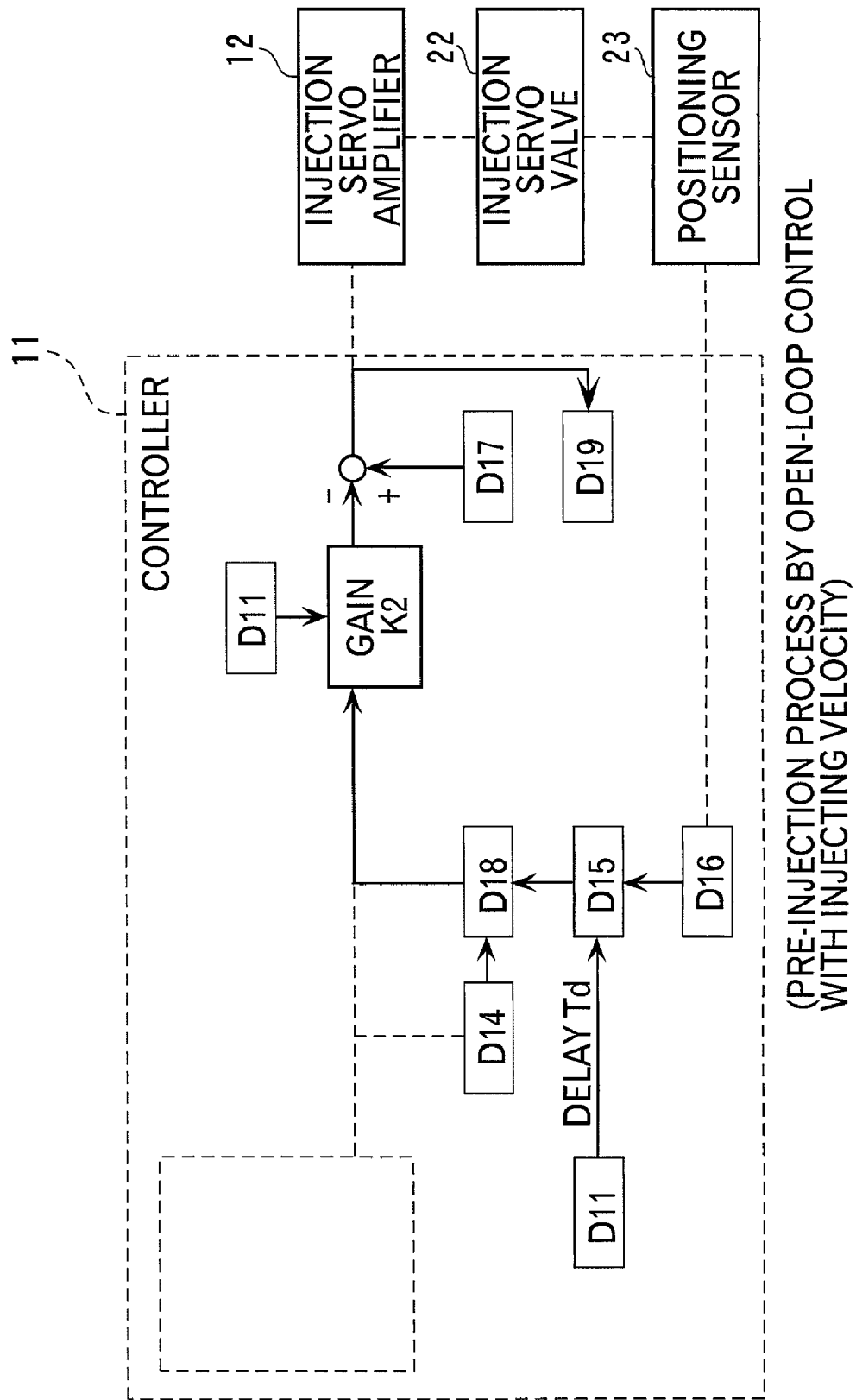
FIG. 4 is a block diagram showing a control model for pre-injection processing for open loop control of injection velocity in the embodiment shown in FIG. 1.

In the target velocity data D14 obtained as described above, one shot of injection operation is recorded in the pre-injection processing for open loop control of injection velocity shown in FIG. 4 in place of the time-series position command data D13, which is basic data for position command in the injection position feedback control shown in FIG. 3, and the target velocity data D14 is used as a standard for calculating a correction value in accordance with the present invention (described later).

The detected velocity data area 115 stores detected velocity data D15.

The position feedback data area 116 stores position feedback data D16.

Figure 5:
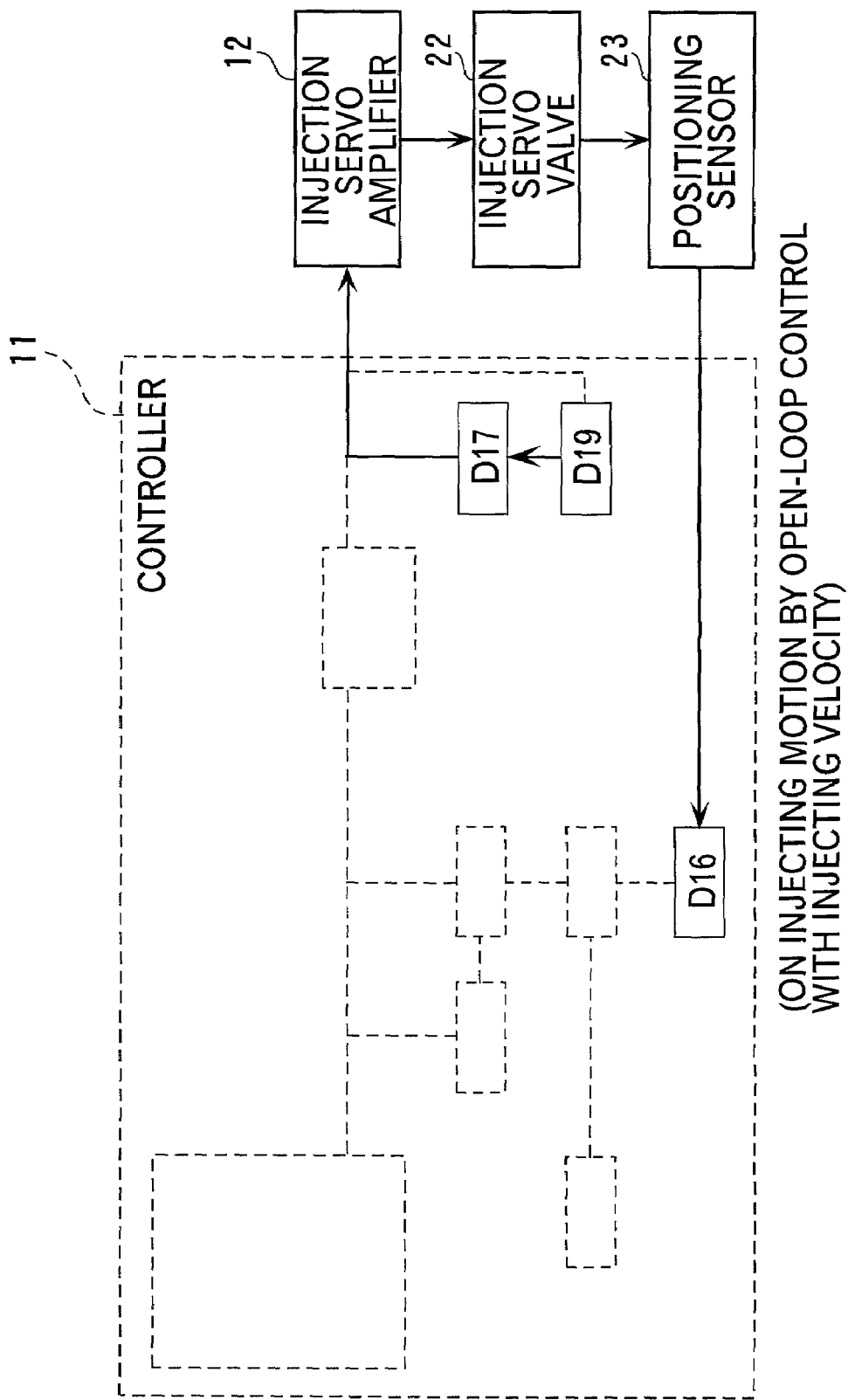
FIG. 5 is a block diagram showing a control model for injection operation by open loop control of injection velocity in the embodiment shown in FIG. 1.

In the position feedback data D16, the output from the position sensor 23 of the die-casting machine 20 for one shot of injection operation is recorded in time sequence during the injection operation by injection position feedback control shown in FIG. 3 or during the injection operation by open loop control of injection velocity shown in FIG. 5, and the position feedback data D16 is a function of position L and time T.

The detected velocity data D15 is data for one shot of injection operation in terms of velocity V and time T derived from the position feedback data D16. Specifically, velocity V can be obtained by differentiating by time at each time point of the position feedback data D16 or by dividing a section distance (difference in position L) in the position feedback data D16 by a difference in time T for that section.

The amplifier command data area 117 stores amplifier command data D17.

The auxiliary amplifier command data area 119 stores auxiliary amplifier command data D19.

The amplifier command data D17 and auxiliary amplifier command data D19 are data for one shot of injection operation to be inputted in the injection servo amplifier 12 as shown in FIGS. 3 to 5, which is a function of velocity V and time T.

In the state in which the controller 11 is operated by the injection position feedback control as shown in FIG. 3, a value obtained by multiplying the time-series position command data D13 by the gain K1 is sent to the injection servo amplifier 12. In this state, the data from the gain K1 is repeatedly recorded for one shot sequentially in the amplifier command data area 117 as the amplifier command data D17.

In relation to the later-described pre-injection processing for open loop control of injection velocity, the above-described data may be recorded once in the auxiliary amplifier command data area 119 as the auxiliary amplifier command data D19, and be transferred as the amplifier command data D17.

In the state in which pre-injection processing is performed so that the controller 11 is operated by open loop control of injection velocity in accordance with the present invention as shown in FIG. 4, the amplifier command data D17 at a specific time point is read from the amplifier command data area 117, the later-described correction value calculation is performed by using correction value data D18, and the calculation result is recorded in the auxiliary amplifier command data D19.

In the state in which the controller 11 performs injection operation by open loop control of injection velocity in accordance with the present invention as shown in FIG. 5, the auxiliary amplifier command data D19 is transferred to the amplifier command data D17, and the amplifier command data D17 is read sequentially according to the progress of injection operation, and is sent to the injection servo amplifier 12.

The correction value data area 118 stores correction value data D18.

The correction value data D18, which is used to correct the aforementioned amplifier command data D17, is calculated from a difference between the aforementioned target velocity data D14 and detected velocity data D15 (each data for one shot of the previous injection operation is stored).

At this time, in order to avoid the influence of servo delay often occurring in the detected velocity data D15 with respect to the target velocity data D14, the phase of the detected velocity data D15 is advanced by referring to the servo delay Td set in the parameter data D11, by which adjustment is made so that proper measures can be taken for the comparison of data.

The adjustment of servo delay may be set individually for each point at which the operation changes remarkably (start of low-velocity injection, switching to high-velocity injection, start of deceleration, etc.), by which more precise calculation can be performed.

Figure 11:
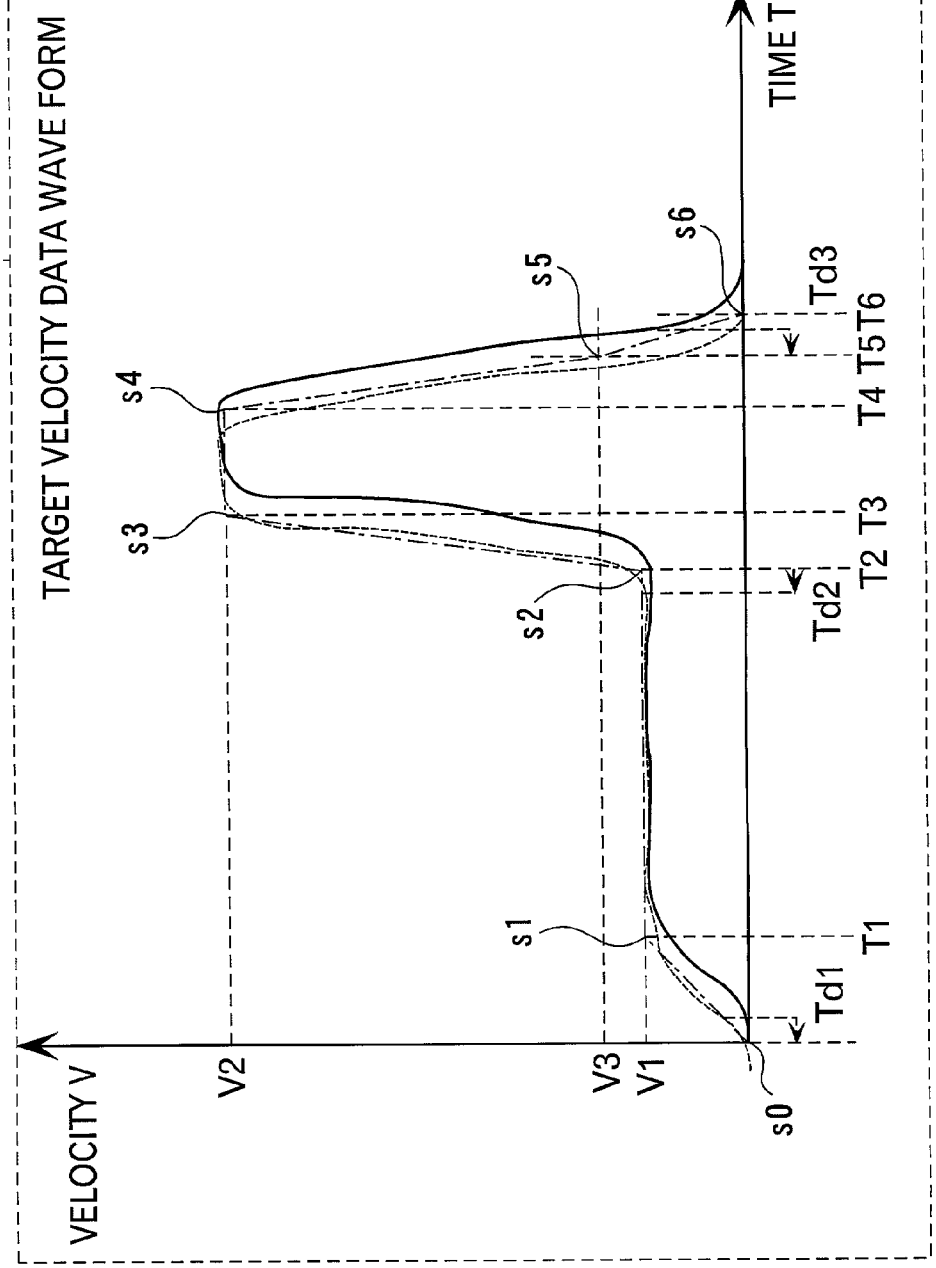
FIG. 11 is a graph showing adjustment of servo delay in the embodiment shown in FIG. 1.

Specifically, as shown in FIG. 11, it is desirable that the adjustment of low-velocity injection section be made by the adjustment of servo delay Td1 at point s0, the adjustment of high-velocity injection section be made by the adjustment of servo delay Td2 at point s2, and the adjustment of deceleration section be made by the adjustment of servo delay Td3 at point s5.

In this embodiment configured as described above, the following operation is performed.

Figure 12:
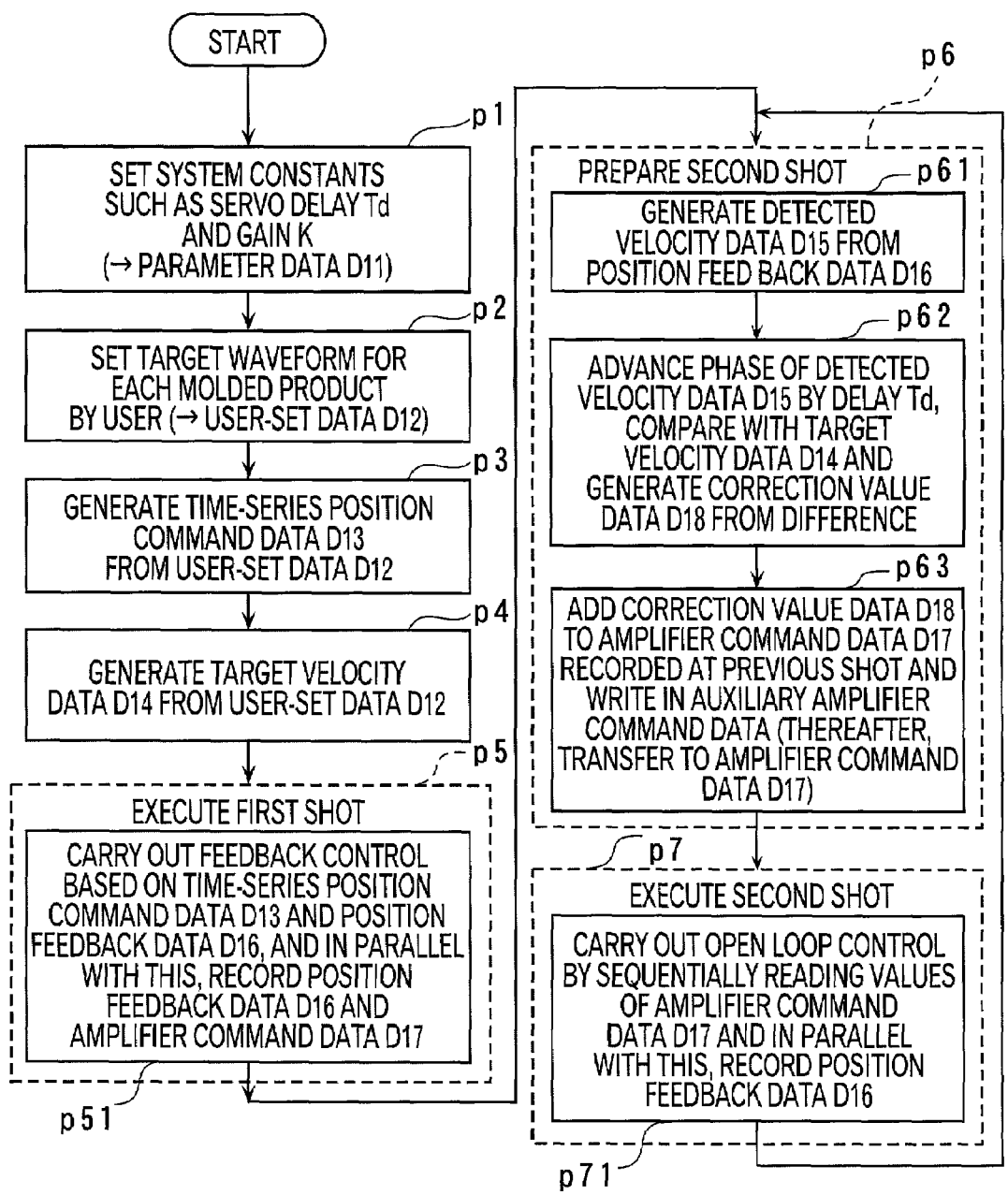
FIG. 12 is a flowchart showing processing in the embodiment shown in FIG. 1.

In FIG. 12, when the die-casting machine 20 is controlled by the control unit 10, system constants such as the servo delay Td (Td1 to Td3, etc.) and servo gain K are set in the parameter data D11 in advance (Process P1).

Before die-cast injection molding is performed, the target waveform pattern (see FIGS. 6 and 7) for each molded product is set by the user (Process P2).

After the user-set data D12 is set, the controller 11 calculates the time-series position command data D13 and target velocity data D14 prior to the injection operation (Processes P3 and P4).

After these data are prepared, the injection operation can be performed. In this state, if an injection command is issued, the die-casting machine 20 performs the injection operation under the control of the control unit 10.

At a first shot, the ordinary injection position feedback control is carried out (Process P5).

Specifically, the ordinary injection position feedback control is carried out based on the time-series position command data D13 and position feedback data D16.

At this time, the position feedback data D16 and amplifier command data D17 are stored (Process P51, control model shown in FIG. 3).

After the first shot by the injection position feedback control is completed, pre-injection processing necessary for performing a second shot by open loop control of injection velocity is carried out (Process P6).

Specifically, after the position feedback data D16 is obtained, the detected velocity data D15 is generated based on this value (Process P61, control model shown in FIG. 4).

Further, after the detected velocity data D15 is appropriately adjusted by the servo delay Td, comparison is made with the target velocity data D14, and the correction value data D18 is generated from each difference (Process P62).

Then, the correction value data D18 is added to the amplifier command data D17 recorded at the previous shot (including the shot in progress), and the result is written in the auxiliary amplifier command data D19 (Process P63).

The auxiliary amplifier command data D19 is transferred to the amplifier command data D17 before the next injection operation by open loop control of injection velocity shown in FIG. 5 (second shot in Process P7 in FIG. 12) is started.

These processes P61 to P63 may be performed in parallel with the shot, not as the pre-injection processing in Process P6. When these processes are performed in parallel with the shot, the performance of only the process P61, or the processes P61 and P62, or a series of the processes P61 to P63 can be selected appropriately.

Even if the above-described ordinary injection position feedback control is carried out once, the open loop control of injection velocity accompanied by correction can be carried out. Although the feedback control of injection position is carried out once for the first shot in this embodiment, it may be carried out two or more times.

After the above-described pre-injection processing is finished, the second shot by open loop control of injection velocity is executed (Process P7).

Specifically, the ordinary injection position feedback control based on the time-series position command data D13 and position feedback data D16 is ceased, and instead the open loop control of injection velocity is carried out by sequentially reading the values of the amplifier command data D17 (values transferred from the auxiliary amplifier command data D19 previously) (Process P71, control model shown in FIG. 5).

After the second shot is completed, the process returns again to the pre-injection processing (Process P6), and the pre-injection processing for open loop control of injection velocity (Process P6) and the injection operation (Process P7) are repeated.

The pre-injection processing (Processes P61 to P63) may be performed in parallel with the injection operation by open loop control of injection velocity (Process P7). When the processing is performed in parallel with the shot, the performance of only the process P61, or the processes P61 and P62, or a series of the processes P61 to P63 can be selected appropriately.

According to this embodiment, the following effects can be achieved.

Since the correction value is calculated based on the previous injection operation, and the command data for the previous injection operation is corrected by this correction value, an exact operation can be ensured in the next injection operation.

At this time, the detected velocity data can be calculated from position feedback.

In the present invention, therefore, proper velocity control can be realized even in the injection control of a die-casting machine based on position feedback.

In this embodiment, by first performing the operation by the ordinary injection position feedback control, special preparations necessary for the calculation of correction value of the present invention or the like can be avoided. Also, by using the previous data obtained during the operation by injection position feedback control, the control is shifted to the open loop control of injection velocity for the next shot, so that the operation control based on the calculation of correction value in accordance with the present invention can be carried out.

In this embodiment, by making the adjustment of servo delay Td, the corresponding operation portions can be allowed to correspond to each other when a difference between the detected velocity data and the target velocity data for calculating the correction value is calculated.

In particular, since the adjustment of servo delay is made for each of the low-velocity section, high-velocity section, and deceleration section of injection operation, a shift between the detected velocity data and the target velocity data due to servo delay can be compensated more reliably, so that a more exact correction value can be obtained.

Thus, the user can perform programming with the injection waveform pattern in terms of position and velocity in mind. Such an injection waveform pattern in terms of position and velocity has conventionally been general for a die-casting machine and easily understood by the operator. Therefore, by deriving various types of data necessary for the present invention from the injection waveform pattern in terms of position and velocity, the ease of user setting can be increased, and the handling performance can be improved further.

The present invention is not limited to the above-described embodiment, and modifications within the scope in which the object of the present invention is achieved are embraced in the present invention.

For example, the type, standard, and the like of the injection cylinder unit 21 are arbitrary, and the hardware configuration of the control unit 10 including the controller 11, software means for realizing the system, and the like can be set appropriately based on the existing computer technology.

What is claimed is:

1. An injection control method for a die-casting machine, wherein molten material is injected into a casting mold by an injection cylinder unit, comprising:

setting target velocity data specifying an injection operation required for the injection cylinder unit in advance;

performing a first shot of an injection operation, and recording command data provided to the injection cylinder unit and detecting velocity data indicating the operation performed by the injection cylinder unit during the first shot of the injection operation;

determining a difference between the detected velocity data and the target velocity data;

calculating a correction value based on the difference by operating the injection cylinder unit for a predetermined number of the injection shots by injection position feedback control;

terminating the injection position feedback control after the predetermined number of injection shots;

using the calculated correction value and generating command data for a second shot of the injection operation; and operating the injection cylinder unit by providing to it the command data for the second shot of the injection operation while shifting the control to open loop control of injection velocity by command data generated from the correction value and the previous command data, wherein a value of servo delay in the injection cylinder unit is set in advance, in calculating the correction value, the difference between the detected velocity data and the target velocity data is calculated in a state that the phase of the detected velocity data is advanced by the servo delay, and adjustment of the servo delay is made for each of low-velocity section, high-velocity section, and deceleration section of a shot of the injection operation.

2. The injection control method for a die-casting machine according to claim 1, wherein in setting the target velocity data, a pattern in terms of position and velocity for specifying injection operation is set in advance by a user, the pattern being converted into time-series position command data in terms of position and time so as to be used for injection position feedback control, as well as the pattern being converted into target velocity data in terms of velocity and time.

* * * * *